Jan. 8, 1929.
T. F. BARTON
1,698,293
CONTROL FOR DYNAMO ELECTRIC MACHINES
Filed Feb. 18, 1921
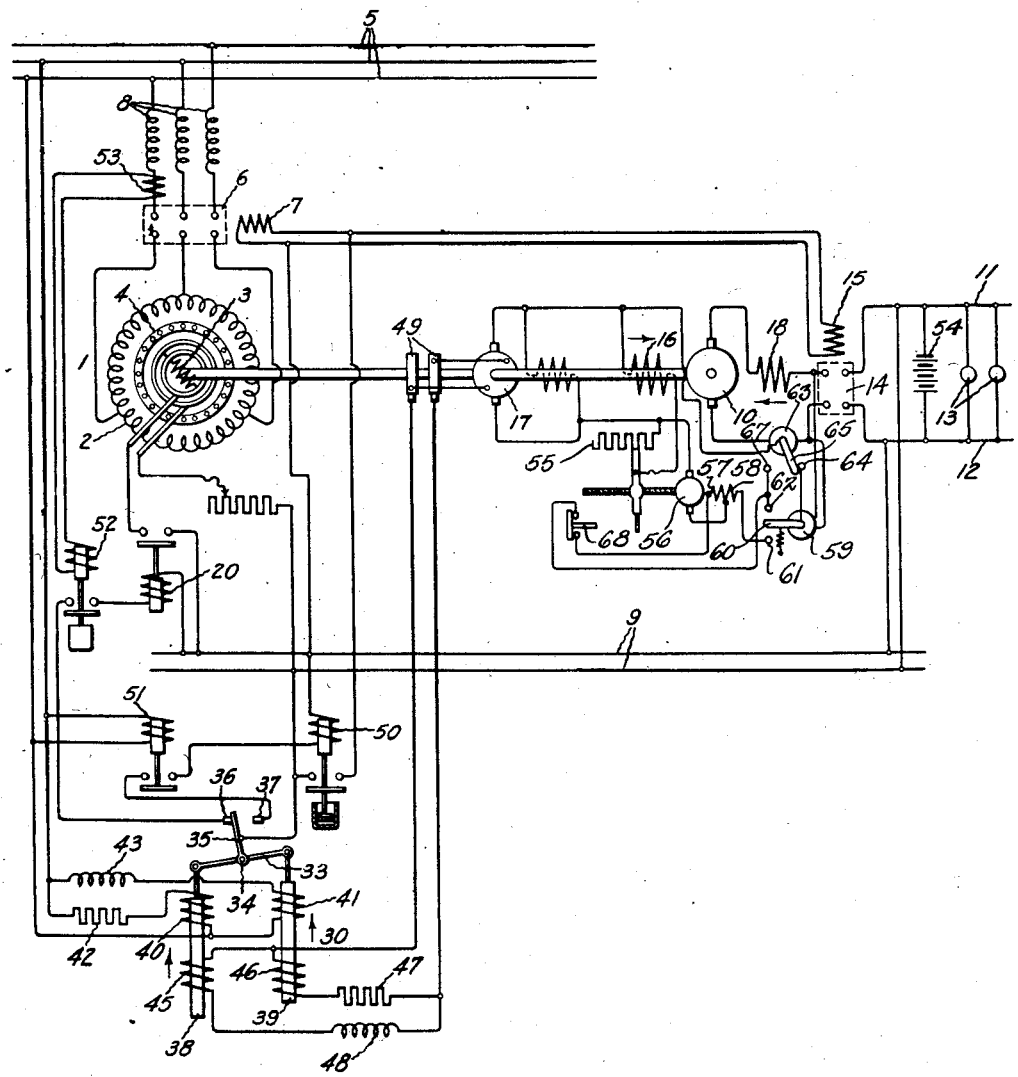
Inventor:
Theophilus F. Barton,
by Albert G. Davis
His Attorney.

Patented Jan. 8, 1929.

1,698,293

UNITED STATES PATENT OFFICE.

THEOPHILUS F. BARTON, OF SCHENECTADY, NEW YORK, ASSIGNOR TO GENERAL ELECTRIC COMPANY, A CORPORATION OF NEW YORK.

CONTROL FOR DYNAMO-ELECTRIC MACHINES.

Application filed February 18, 1921. Serial No. 446,027.

My invention relates to the control of dynamo electric machines and particularly to the control of synchronous motors. My invention is especially applicable to control arrangements for synchronous motors of synchronous motor-driven motor generator sets where the supply circuits are subject to abnormal conditions, which cut off the supply of power to the motors, and the generators are adapted to supply current to distribution circuits subject to wide and sudden changes in load, which cause the motors to fall out of step. One object of my invention is to provide a control arrangement whereby a synchronous motor may remain connected to the supply circuit under all abnormal conditions on the supply circuits and under all abnormal load conditions so that as soon as the conditions become normal again, the motor is restored to its normal operating condition.

Another object of my invention is to provide a simple and reliable control arrangement for a synchronous motor having a short circuited winding on its field member which enables the motor to develop its maximum available torque at all times so that in case the supply circuit fails or the load increases and pulls the motor out of step the motor will pull itself back into step as soon as the supply circuit is reenergized or the load decreases sufficiently. In accordance with my invention I provide an arrangement responsive to the slip frequency of the motor for controlling the direct current field circuit of the motor.

A further object of my invention is to provide an arrangement for limiting the length of time the motor will continue to run out of step so as to protect the short circuited winding. In accordance with this feature I provide an arrangement whereby either the motor may be disconnected from the supply circuit or the load may be disconnected from the motor or both load and supply circuit may be disconnected from the motor after the motor has run out of step for a predetermined length of time.

My invention will be better understood from the following description taken in connection with the accompanying drawing, and its scope will be pointed out in the appended claims.

Referring to the accompanying drawing, 1 represents a synchronous motor which is provided with an armature winding 2, a field winding 3 and a short circuited winding 4 on its field member. The armature winding 2 is connected to an alternating current supply circuit 5 by any suitable switching means such as a circuit breaker 6 provided with a trip coil 7 which when energized trips the circuit breaker open. The alternating current supply circuit 5 may be supplied with alternating current from any suitable source of alternating current not shown. Reactances 8 may also be used between the armature winding 2 and the supply circuit 5 so as to limit the current flowing through the armature winding 2 in case the power on the supply circuit 5 goes off and then comes on again while the motor is still connected to the supply circuit. The field winding 3 is connected to a control circuit 9 which in turn is connected to any suitable source of current.

The motor 1 drives a direct current generator 10 which is arranged to supply current to a distribution circuit indicated by the mains 11 and 12 across which is connected the control circuit 9 and a load diagrammatically indicated at 13. The generator 10 may be connected to the mains 11 and 12 by any suitable switching means such as a circuit breaker 14 provided with a trip coil 15 which when energized trips the circuit breaker open. The generator is shown as being provided with a field winding 16 which may be supplied with current from any suitable source of direct current such as an exciter 17 driven by the motor, and a differential series field winding 18. The generator is also preferably provided with a protective means of any suitable character such as is disclosed in Letters Patent 1,527,641 to Carl M. Gilt, dated February 24, 1925 and assigned to the same assignee as this application for limiting the output of the generator so that it can remain connected to the distribution circuit under all abnormal load conditions without injury resulting to the generator.

In the drawing I have shown an arrangement similar to one of the embodiments disclosed in the above mentioned patent for decreasing the excitation of the generator 10 under abnormal load circuit conditions so as to limit the output of the generator supplied to the faulty load circuit. In this arrangement the value of the electromotive force impressed across the field winding 16 is adjusted by a motor operated rheostat 55 in the circuit thereof. As shown, the motor operated rheostat includes a pilot motor 56 provided with reversely connected field windings 57 and 58. A contact making voltmeter 59 is connected across the load circuit 11 and upon a decrease in line voltage the contact arm 60 of the voltmeter 59 engages the contact 61 to complete the circuit of the pilot motor 56 through the winding 58 to operate the rheostat 55 to increase the voltage impressed across the field winging 16. Upon an increase in voltage across the load circuit the contact arm 60, engages the contact 62 to complete a circuit through the oppositely wound field winding 57 to operate the pilot motor 56 in the opposite direction to effect a decrease in the voltage impressed across the field winding 16. A contact making ammeter 63 is provided in series with the generator 10 and this meter is adjusted in any well known manner, as for example by an adjustable shunt, to maintain the contact 64 closed for all currents below a predetermined value. It will be observed that the circuit of the pilot motor 56 leads through the contact arm 65, contact 64 of the contact making ammeter 63, and the connection 66 to the contact arm 60 of the contact making voltmeter 59. As thus arranged the operation of the contact making voltmeter to control the rheostat 55 is dependent upon the engagement of the contact arm 65 of ammeter 63 with contact 64. Whenever the current output of the generator 10 reaches a predetermined value contact arm 65 engages contact 67 whereby a circuit is completed through pilot motor 56 and its field winding 57 so that the rheostat 55 is operated in a direction to reduce the voltage impressed across the field winding 16. A limit switch 68 is shown in the circuit of the winding 57 and is arranged to be opened when the rheostat 55 has been operated to a position where the excitation of the generator field winding 16 has been reduced to a predetermined value.

The operation of the protective arrangement shown will be obvious to one skilled in the art. The contact making voltmeter 59 operates to maintain the generator voltage constant until a predetermined output has been reached after which the voltmeter is rendered inoperative to control the rheostat. At a predetermined output the contact making ammeter 63 engages contact 67 so that the motor operated rheostat 55 is operated to decrease the excitation of the field winding 16 so as to assist the differential field winding 18 in decreasing the excitation and the voltage of the generator in order to reduce the output thereof and thereby reduce the load on the motor. Consequently, whenever a short-circuit or a predetermined overload occurs which is sufficient to pull the motor out of step the regulating means associated with the generator operates to decrease the excitation of the generator and thereby reduce the load on the motor.

It is well known that to obtain the maximum available torque from a synchronous motor which is provided with a direct current field circuit and a short circuited winding on its field member, the field circuit of the motor should be energized at synchronous speed and at speeds slightly below synchronous speed, but for still lower speeds the direct current field circuit should be deenergized. Therefore, if the frequency of the supply circuit were absolutely constant, a maximum available torque from a synchronous motor could be obtained by using a switch which is responsive to the speed of the motor for opening and closing the field circuit at the proper time. Since, however, the frequency of most supply circuits varies more or less, such a speed responsive switch for controlling the field circuit is not satisfactory because the switch always opens and closes the field circuit at a predetermined speed independent of the synchronous speed of the motor and therefore will not always operate at the right time.

In accordance with my invention, I control the field circuit of the motor in response to the slip frequency thereof. The arrangement which I have shown in the drawing for controlling the field circuit comprises a relay 20, the contacts of which are in the circuit of the winding 3. The circuit of this relay 20 is controlled by a device 30 which is responsive to the slip frequency of the motor. This device 30 comprises a balanced lever 33 which is pivoted at 34 and carries a contact 35 which is adapted to engage the contacts 36 and 37. The cores 38 and 39 are connected to opposite ends of the lever 33. Around these cores are wound the coils 40 and 41 respectively, these coils being connected to the supply circuit 5. An ohmic resistance 42 is connected in the circuit of the coil 40 and an inductance coil 43 is connected in the circuit of the coil 41 so that an increase in the voltage of the supply circuit 5 will not cause any change in the relative strength of the magnetomotive forces set up by the coils 40 and 41, while a change in the frequency will cause such a change in the relative strength of the magnetomotive forces. Around cores 38 and 39 are also wound the coils 45 and 46 respectively which are supplied with current from the armature winding of the exciter 17 through the slip rings 49 so that the frequency of the current supplied to these coils varies directly with the speed of the motor. Any other suitable source of alternating current whose frequency varies directly with the speed of the motor may be used, however. An ohmic resistance 47 is connected in series with the coil 46 and an inductance coil 48 is connected in series with the coil 45 so that a change in voltage will not cause any change in the relative strength of the magnetomotive forces set up by the coils 45 and 46 while a change in the frequency will cause such a change in the relative strength of the magneto-motive forces.

The coils 40 and 45 are arranged around the core 38 so that the forces exerted thereon by the two coils tend to move the core in the same direction. The coils 41 and 46 are similarly arranged around the core 39 so that the forces exerted thereon by the two coils tend to move the core in the same direction. Therefore, the contact 35 is moved out of engagement with the contact 36 and into engagement with contact 37 when the sum of the forces exerted by the coils 40 and 45 exceeds the sum of the forces exerted by the coils 41 and 46 and the contact 35 is moved out of engagement with the contact 37 and into engagement with the contact 36 when the sum of the forces exerted by the coils 41 and 46 exceeds the sum of the forces exerted by the coils 40 and 45.

It will be observed that so far as the two coils 40 and 41 are concerned, an increase in the line frequency decreases the force exerted by the coil 41 relatively to the force exerted by the coil 40, and so far as the two coils 45 and 46 are concerned an increase in the frequency of the current supplied thereto increases the force exerted by the coil 46 relatively to the force exerted by the coil 45. Therefore, when the line frequency increases, currents of a higher frequency have to be supplied to the coils 45 and 46 in order that the sum of the forces exerted by the coils 41 and 46 may exceed the sum of the forces exerted by the coils 40 and 45, and when the line frequency decreases, the frequency of the currents supplied to the coils 45 and 46 does not have to be so high in order that the sum of the forces exerted by the coils 41 and 46 may exceed the sum of the forces exerted by the coils 40 and 45. It will be obvious, therefore, that the position of the contact 35 depends upon the difference between the frequencies of the currents supplied to the two sets of coils. Since the frequency of the currents supplied to the coils 45 and 46 is proportional to the speed of the motor, and the frequency of the currents supplied to the coils 40 and 41 is proportional to the synchronous speed of the motor, it will be evident that the position of the contact 35 depends upon the difference between these two speeds or, in other words, is responsive to the slip frequency of the motor.

It will be evident that so far as the operation of the relay 30 in response to the slip frequency is concerned it is immaterial whether the coils are so designed that the force exerted by the coil 41 exceeds, is equal to, or is less than the force exerted by the coil 40 for a particular line frequency, so long as the coils 45 and 46 are so designed that the sum of the forces exerted by the coils 40 and 45 is less than the sum of the forces exerted by the coils 41 and 46 when the slip frequency is less than a certain percent of the line frequency, and is greater than the sum of the forces exerted by the coils 41 and 46 when the slip frequency is greater than this value.

It will be assumed, however, for the purpose of this description, that the coils 40 and 41 are so designed that throughout the normal frequency range of the supply circuit 5 the force exerted by the coil 41 exceeds the force exerted by the coil 40, and that the force exerted by the coil 45 exceeds, for all normal operating speeds of the motor, the force exerted by the coil 46. The coils are also arranged in such a manner that when the slip frequency is less than a certain amount the difference between the forces exerted by the coils 40 and 41 is greater than the difference between the forces exerted by the coils 45 and 46, so that the contact 35 is maintained in engagement with the control 36, and when the slip frequency exceeds this amount the difference between the forces exerted by the coils 45 and 46 exceeds the difference between the forces exerted by the coils 40 and 41 so that the contact 35 is maintained in engagement with the contact 37. The contact 35 when in engagement with the contact 36 completes the circuit of the relay 20 across the control circuit 9 and when in engagement with contact 37 completes the circuit of a relay 50 across the control circuit 9. The relay 50 is constructed in any well known manner so that it does not close its contacts until after the circuit thereof has been closed for a certain length of time. The closing of the contacts of this relay 50 completes the circuit of the trip coils 7 and 15 across the control circuit 9. The energization of the trip coil 7 trips open the circuit breaker 6 to disconnect the motor 1 from the supply circuit 5 and the energization of the trip coil 15 trips open the circuit breaker 14 to disconnect the generator 10 from the mains 11 and 12. It is obvious, however, that instead of opening both circuit breakers, only one of these breakers may be opened if it is so desired. The circuit of relay 50 is also controlled by a low voltage relay 51 connected across the supply circuit 5. The purpose of this relay is to prevent the energization of relay 50 in case the supply circuit is deenergized at the time the contact 35 engages contact 37. The circuit of relay 20 is controlled by a relay 52 connected to a current transformer 53 in one of the conductors connecting the motor 1 to the supply circuit. This relay is so arranged that it keeps its contacts closed so long as the current supplied to the motor does not decrease below a predetermined value. The purpose of this relay is to open the circuit of the field winding 3 in case the power goes off on the supply circuit.

The operation of the arrangement shown in the drawing is as follows: As long as the supply circuit remains energized and the load on the generator 10 does not exceed the capacity of the motor, the motor continues to run at synchronous speed. When, however, the load connected to the generator 10 increases, due for example to a short circuit across the mains 11 and 12, so that the motor falls out of step and begins to slow down, the frequency of the current supplied to the coils 45 and 46 from the exciter 17 decreases so that the force exerted by the coil 45 increases relative to the force exerted by coil 46. When the slip frequency of the motor has increased to a predetermined value, this predominating force of the coil 45 is sufficient to cause contact 35 to disengage contact 36 and to engage contact 37. The disengagement of contacts 35 and 36 opens the circuit of the coil of relay 20 whereupon the field circuit of the motor is opened. The motor, however, remains connected to the supply circuit 5 and continues to run as an induction motor having a short circuited secondary winding and at a speed which depends upon the load connected to the generator. In order to protect the short circuited winding 4 of the motor, it is desirable not to run the motor in this manner indefinitely and therefore I have provided the relay 50 which is energized by the engagement of contacts 35 and 37. This relay 50 does not close its contacts until a predetermined length of time after the circuit thereof is completed. When the relay 50 closes its contacts it completes the circuit of the trip coil 7 whereupon the circuit breaker 6 is tripped open to disconnect the motor from the supply circuit 5 and also completes the circuit of the trip coil 15 whereupon the circuit breaker 14 is tripped open to disconnect the generator 10 from the mains 11 and 12. It is apparent, however, that in many cases it may be desirable to disconnect the generator 10 only. In such a case, as soon as the circuit breaker 14 is opened, the motor 1 is relieved of the greater portion of its load so that the speed thereof increases and when the slip frequency decreases to a predetermined per cent of the frequency of the supply circuit 5 the device 30 operates to affect the operation of the relay 20 to close the field circuit whereupon the motor is pulled into step with the supply circuit 5. As soon as it is so desired, the mains 11 and 12 may be supplied again with current from the generator 10, by merely closing the circuit breaker 14 which is preferably of the manually reset type.

If the abnormal condition which caused the motor to fall out of step is of short duration, so that the relay 50 does not have time to close its contacts before normal conditions are restored, it is apparent that as soon as the motor is relieved of its overload the speed thereof increases and the device 30 is operated at the proper slip frequency to pull the motor back into step. It is apparent therefore that my control arrangement is of great utility in systems of electrical distribution, such as the well known Edison systems where it is very desirable that continuity of service be maintained at all times.

Let us now assume that while the motor 1 is connected to the supply circuit 5 the supply circuit fails. Under these conditions the current supplied to the motor decreases so that the relay 52 opens its contacts thereby opening the circuit of the field winding 3. The opening of the field circuit of the motor prevents it from operating as a synchronous generator to supply power to the circuit 5. The relay 52 is preferably provided with any suitable means such as a dash pot to make the action thereof sluggish. As soon as the field circuit is opened the coils 40 and 41 become deenergized so that the resultant force of the coils 45 and 46 causes the contact 35 to disengage the contact 36 and to engage contact 37, thereby opening the field circuit of the motor. The object in opening the field circuit at contact 36 at this time is to prevent the field being energized when the supply circuit is reenergized and the relay 52 closes its contacts due to the rush of current into the armature winding 2.

Since no current is supplied to the motor 1 from the supply circuit 5 when the power on the supply circuit 5 goes off, there is no voltage induced in the short circuited winding 4 so there is no danger of the short circuited winding being injured as long as the power is off. Therefore, the low voltage relay 51 is provided in the circuit of the relay 50 so that the circuit of the relay 50 can only be closed when the voltage of the supply circuit 5 is above a predetermined value. As long as the supply circuit 5 remains deenergized the motor 1 is driven by the generator 10 acting as motor supplied with current from some other source such as a battery 54 which may be connected to the mains 11 and 12. It is apparent that this speed is much below the normal synchronous speed of the motor so that the contact 35 will remain in engagement with contact 37 when the supply circuit is reenergized. As soon as the supply circuit 5 is again energized current is supplied to the motor 1 so that relay 52 closes its contacts. The motor then speeds up and at the proper slip frequency the device 30 operates to close the field circuit of the motor to pull it into step. The reactances 8 are provided in the circuit between the armature winding 2 and supply circuit 5 so as to limit the rush of current through the armature winding 2 when the supply circuit is reenergized.

While I have shown and described one embodiment of my invention, many modifications and changes may be made therein without departing from the scope and spirit of my invention and I aim to cover in the appended claims all such modifications and changes.

What I claim as new and desire to secure by Letters Patent of the United States, is—

1. In a system of electrical distribution, a source of alternating current, a synchronous dynamoelectric machine adapted to be connected to said source, switching means for connecting said machine to said source, means connected and arranged so that its operation is dependent upon the speed of said machine for controlling the excitation of said machine, and means for permitting said excitation controlling means to control the excitation of said machine only when said source is energized.

2. In a system of electrical distribution, a source of alternating current, a synchronous dynamo electric machine adapted to be connected to said source, switching means for connecting said machine to said source, means connected and arranged so that its operation is dependent upon the speed of said machine for controlling the excitation of said machine, and means responsive to the current supplied to said machine to permit the control of the excitation by said last mentioned means only when the current supplied by said source to said machine exceeds a predetermined value.

3. In a system of electrical distribution, a source of alternating current, a synchronous motor adapted to be connected to said source, switching means for connecting said motor to said source, means connected and arranged so that its operation is dependent upon the speed of said motor for controlling the excitation of said motor, and timing means responsive to the current supplied to said motor arranged to permit the control of the excitation by said last mentioned means only when the current supplied by said source to said motor exceeds a predetermined value.

4. In combination, a source of alternating current, a synchronous motor adapted to be connected to said alternating source, a dynamo electric machine driven by said motor and adapted to supply alternating current, a field circuit for said motor, and means responsive to the difference between the frequency of said source and frequency of the current supplied by said dynamo electric machine for controlling said field circuit.

5. A system of electrical distribution comprising a source of alternating current, a distribution circuit, and a synchronous motor generator set connected between said circuit and said source, said synchronous motor being provided with a direct current field circuit and a short circuited winding on its field member characterized by the fact that means are provided for interrupting said direct current field circuit so that said motor operates as an induction motor when the slip frequency of said motor reaches a certain per cent of the frequency of said source of alternating current.

6. In a system of electrical distribution, a source of alternating current, a distribution circuit, a synchronous motor adapted to be connected to said source of alternating current, said motor being provided with a short circuited winding on its field member and a direct current field circuit, switching means for connecting said motor to said alternating current source, a generator driven by said motor and adapted to be connected to said distribution circuit to supply current thereto, switching means for connecting said generator to said distribution circuit, means adapted to interrupt said direct current field circuit when the slip frequency of said motor exceeds a certain per cent of the frequency of said source of alternating current, and means adapted to effect the operation of one of said switching means to disconnect the machine associated therewith from the corresponding circuit after said direct current field circuit has been open for a predetermined length of time.

7. In a system of electrical distribution, a source of alternating current, a distribution circuit, a synchronous motor adapted to be connected to said source of alternating current, said motor being provided with a short circuited winding on its field member and a direct current field circuit, switching means for connecting said motor to said alternating current source, a generator driven by said motor and adapted to be connected to said distribution circuit to supply current thereto, switching means for connecting said generator to said distribution circuit, means adapted to interrupt said direct current field circuit when the slip frequency of said motor exceeds a certain per cent of the frequency of said source of alternating current, means adapted to effect the operation of one of said switching means after said direct current field circuit has been open for a predetermined length of time, and means responsive to the voltage of said supply circuit for controlling the operation of said last-mentioned means.

8. In a system of electrical distribution, a source of alternating current, a distribution circuit, a synchronous motor adapted to be connected to said source of alternating current, said motor being provided with a short circuited winding on its field member and a direct current field circuit, switching means for connecting said motor to said alternating current source, a generator driven by said motor and adapted to be connected to said distribution circuit to supply current thereto, switching means for connecting said generator to said distribution circuit, means adapted to interrupt said direct current field circuit when the slip frequency of said motor exceeds a certain per cent of the frequecny of said source of alternating current, and means adapted to effect the operation of both of said switching means to disconnect the dynamo electric machines associated therewith from the corresponding circuits.

9. In a system of electrical distribution, a source of alternating current, a distribution circuit, a synchronous motor adapted to be connected to said source of alternating current, said motor being provided with a short circuited winding on its field member and a direct current field circuit, switching means for connecting said motor to said alternating current source, a generator driven by said motor and adapted to be connected to said distribution circuit to supply current thereto, switching means for connecting said generator to said distribution circuit, means adapted to interrupt said direct current field circuit when the slip frequency of said motor exceeds a certain per cent of the frequency of said source of alternating current, means adapted to effect the operation of both of said switching means to disconnect the dynamo electric machines associated therewith from the corresponding circuits, and means responsive to the voltage of said supply circuit for controlling the operation of said last mentioned means.

10. In a system of electrical distribution, a source of alternating current, a distribution circuit, a synchronous motor adapted to be connected to said source of alternating current source, said motor being provided with a short circuited winding on its field member and a direct current field circuit, switching means for connecting said motor to said alternating current source, a generator driven by said motor and adapted to be connected to said distribution circuit to supply current thereto, switching means for connecting said generator to said distribution circuit, means adapted to interrupt said direct current field circuit when the slip frequency of said motor exceeds a certain per cent of the frequency of said source of alternating current, means adapted to effect the operation of one of said switching means after said direct current field circuit has been open for a predetermined length of time, and means responsive to the voltage of said supply circuit for preventing the operation of said last-mentioned means as long as the said voltage remains below a predetermined value.

11. In combination, a source of alternating current, a synchronous motor adapted to be connected to said alternating current source, said motor being provided with a short circuited winding on its field member and a direct current field circuit, means responsive to the slip frequency of said motor for controlling said field circuit, and means responsive to the current supplied from said source to said motor for permitting said field circuit to be completed only when said current exceeds a predetermined value.

12. In a system of electrical distribution, a source of alternating current, a synchronous motor adapted to be connected to said source, switching means for controlling the connection of said motor to said source, means responsive to the slip frequency of said motor for controlling the excitation of said motor, and timing means controlled by said frequency responsive means for effecting the operation of said switching means to disconnect the motor from said source.

13. In a system of electrical distribution, a source of alternating current, a synchronous motor adapted to be connected to said source, switching means for controlling the connection of said motor to said source, means connected and arranged so that its operation is dependent upon the speed of said motor for controlling the excitation of said motor, and timing means operative to cause the operation of said switching means to disconnect said motor from said source after said motor has been in operation for a certain length of time without any excitation.

14. In a system of electrical distribution, a source of alternating current, a synchronous motor adapted to be connected to said source, switching means for connecting said motor to said source, and timing means connected and arranged so that its operation is dependent upon the speed of said motor and the voltage of said source for causing the operation of said switching means to disconnect said motor from said source after said motor has been in operation for a certain length of time without any excitation and the voltage of said source is above a predetermined value.

15. In a system of electrical distribution, a source of alternating current, a distribution circuit, a synchronous motor, switching means for connecting said motor to said source, a generator driven by said motor, switching means for connecting said generator to said distribution circuit, means connected and arranged so that its operation is dependent upon the speed of said motor for controlling the excitation of said motor, and means for causing the operation of one of said switching means to effect the disconnection of the machine associated therewith after said motor has been in operation for a certain length of time without any excitation.

16. In a system of electrical distribution, a source of alternating current, a distribution circuit, a synchronous motor, switching means for connecting said motor to said source, a generator driven by said motor, switching means for connecting said generator to said distribution circuit, means connected and arranged so that its operation is dependent upon the speed of said motor for controlling the excitation of said motor, and means for causing the operation of said last mentioned switching means to effect the disconnection of said generator from said distribution circuit after said motor has been in operation for a certain length of time without any excitation.

17. In a system of electrical distribution, a source of alternating current, a distribution circuit, a synchronous motor, switching means for connecting said motor to said source, a generator driven by said motor, switching means for connecting said generator to said distribution circuit, means connected and arranged so that its operation is dependent upon the speed of said motor for controlling the excitation of said motor, and timing means controlled by said last mentioned means and the voltage of said source for causing the operation of one of said switching means to effect the disconnection of the associated machine after said motor has been supplied with current from said source for a certain length of time and the motor has not been excited during this operation.

18. A system of electrical distribution comprising a source of alternating current, a distribution circuit, a synchronous motor generator set, the synchronous motor of which is provided with a direct current field circuit, and switching means arranged to connect said set between said source and said distribution circuit, characterized by the fact that means are provided for maintaining said field circuit energized when the current supplied by said source to said motor is above a predetermined value and by the further fact that means are provided for interrupting said direct current field circuit without disconnecting said set from between said source and distribution circuit when said motor is pulled out of step with said source by an overload on said distribution circuit.

19. A system of electrical distribution comprising a source of alternating current, a distribution circuit, a synchronous motor generator set, the synchronous motor of which is provided with a direct current field circuit, and switching means arranged to connect said set between said source and said distribution circuit, characterized by the fact that means are provided for interrupting said direct current field circuit without disconnecting said set from between said source and distribution circuit when said source fails or the load connected to said distribution circuit is sufficient to pull said motor out of step with said source.

20. A system of electrical distribution comprising a source of alternating current, a distribution circuit, a synchronous motor generator set, the synchronous motor of which is provided with a direct current field circuit, and switching means arranged to connect said set between said source and said distribution circuit, characterized by the fact that means responsive to the speed of said motor are provided for interrupting said direct current field circuit while said set remains connected between said source and distribution circuit and means are provided for controlling the excitation of the generator when said motor is pulled out of step with said source by an overload on said distribution circuit.

21. A system of electrical distribution comprising a source of alternating current, a distribution circuit, a synchronous motor, switching means for connecting said motor to said source, a generator driven by said motor, switching means for connecting said generator to said distribution circuit, and regulating means for said generator arranged to limit the output of said generator to a safe value under abnormal load conditions on said distribution circuit, characterized by the fact that means are provided for reducing the exciting current of said motor while said motor is operating out of step with said source due to an abnormal load condition on said distribution circuit.

22. A system of electrical distribution comprising a source of alternating current, a distribution circuit, a synchronous motor, switching means for connecting said motor to said source, a generator driven by said motor, switching means for connecting said generator to said distribution circuit, regulating means for said generator arranged to limit the output of said generator to a safe value under abnormal load conditions on said distribution circuit, and means responsive to the slip frequency of said motor for interrupting the exciting current of said motor when said motor is pulled out of step with said source by an abnormal load condition on said distribution.

23. In a system of electrical distribution, a source of alternating current, a synchronous motor connected to said source, means responsive to the slip frequency of said machine for effecting the disconnection of said machine from said source when the slip frequency exceeds a predetermined value, and means responsive to the voltage of said source for preventing the disconnection of said machine from said source by said slip frequency responsive means when said voltage is below a predetermined value.

24. In combination, a source of alternating current, a synchronous dynamo electric machine connected thereto, an excitation circuit for said machine, and means for controlling said excitation circuit comprising means responsive to the slip frequency of said machine arranged to maintain said excitation circuit deenergized when the slip frequency is above a predetermined value and means responsive to the current flowing between said source and said machine to maintain said excitation circuit deenergized when the current is below a predetermined value.

25. The combination with a supply circuit, a distribution circuit and an electrical translating device connected therebetween and operating in synchronism with the supply circuit, of means responsive to the restoration of energy to the supply circuit after an interruption thereof for effecting re-synchronizing of the translating device with the supply circuit.

26. The combination with a supply circuit, a motor normally energized therefrom, a generator driven by the motor and a distribution circuit energized by the generator, of means for causing the generator to operate as a motor from the distribution circuit to drive the motor when the supply of energy from the supply circuit to the motor is interrupted, and a plurality of relays responsive to predetermined conditions in the circuits for controlling said means.

27. In combination, an alternating current supply circuit, a direct current distribution system, a synchronous motor generator set interconnected between said circuit and system, and means for removing the direct current excitation of the synchronous motor when the energy supply to said supply circuit fails and for restoring said direct current excitation to re-synchronize said motor upon the restoration of the supply of energy to said supply circuit including means responsive to predetermined electrical conditions of the motor armature circuit.

28. In combination, an alternating current supply circuit, a direct current distribution system, a synchronous motor generator set interconnected between said circuit and system, excitation means normally connected to the field winding for supplying direct current thereto, and means for effecting the disconnection of said excitation means from the motor field circuit when the energy supply to said supply circuit fails whereby said generator operates as a motor driving said motor as an unexcited machine and for effecting the reconnection of said excitation means to the motor field to re-synchronize said motor upon the restoration of the supply of energy to said supply circuit including a relay responsive to the amount of current flowing between said supply circuit and the synchronous motor of said set.

29. In combination, an alternating current supply circuit, a distribution circuit, an electrical translating device connected between said circuits and normally operating in synchronism with the supply circuit, and means responsive to a predetermined electrical condition of said supply circuit, for controlling the excitation of said device upon the failure of energy supply to said supply circuit and for controlling the re-synchronizing of the translating device with said supply circuit upon the restoration of energy to the supply circuit after an interruption thereof.

30. In combination, an alternating current supply circuit, a distribution system, a synchronous motor generator set interconnected between said supply circuit and system, the synchronous motor of said set normally operating in synchronism with said supply circuit, and means responsive to a predetermined electrical condition in said supply circuit for effecting a reduction in the direct current excitation of said motor upon the failure of the supply of energy to said supply circuit and for effecting an increase in the direct current excitation of said motor to re-synchronize said motor with said supply circuit upon the restoration of energy to said supply circuit after an interruption thereof.

In witness whereof, I have hereunto set my hand this 17th day of February, 1921.

THEOPHILUS F. BARTON.